United States Patent [19]

Gaskill

[11] Patent Number: 4,890,571
[45] Date of Patent: Jan. 2, 1990

[54] DEER SCARECROW

[76] Inventor: John S. Gaskill, 203 Second St., Collinsville, Ill. 62234

[21] Appl. No.: 280,306

[22] Filed: Dec. 5, 1988

[51] Int. Cl.$^4$ ................. A01M 29/02; A47F 8/00; G08B 15/00
[52] U.S. Cl. .................... 116/22 A; 40/421; 43/2; 248/205.2
[58] Field of Search ............ 116/22 A, 22 R; 40/421, 40/422; 248/205.2; 43/1, 2

[56] References Cited

U.S. PATENT DOCUMENTS

| | | | |
|---|---|---|---|
| 726,131 | 4/1903 | Barnes | 43/1 |
| 2,788,762 | 4/1957 | Wright | 116/22 A |
| 3,030,718 | 4/1962 | Kirkman | 40/613 |
| 3,085,545 | 4/1963 | Ore | 116/22 A |
| 4,109,605 | 8/1978 | Bächli | 116/22 A |
| 4,131,079 | 12/1978 | Rousseau, Jr. et al. | 116/22 A |
| 4,302,899 | 12/1981 | DeHart | 43/1 |
| 4,548,375 | 10/1985 | Moss | 285/205.2 |
| 4,598,660 | 7/1986 | Konzak | 116/22 A |
| 4,717,103 | 1/1988 | Kester et al. | 248/229 |

FOREIGN PATENT DOCUMENTS 603037 8/1978 Switzerland ................ 43/1

Primary Examiner—William A. Cuchlinski, Jr.
Assistant Examiner—W. Morris Worth
Attorney, Agent, or Firm—Don W. Weber

[57] ABSTRACT

A deer scarecrow is presented which comprises a main essentially rectangular body with upper collapsable arms. At the upper part of the body is attached a simulated head which may be wrapped around and secured to a suitable limb. Upper arm streamers and lower leg streamers of brightly colored material are attached to the arms and main body. A scent-emitting device is located within a pouch sewn into the main body and a noise-making device is also located in a separate pouch on the main body. When in use, the deer scarecrow would frighten a deer's sense of smell, sight, and hearing. When not in use, the entire device rolls up into a small cylindrical compact unit. The deer scarecrow is highly portable and may be positioned such that the deer are frightened from one area and run into another area where the hunter awaits.

10 Claims, 1 Drawing Sheet

U.S. Patent
Jan. 2, 1990
4,890,571
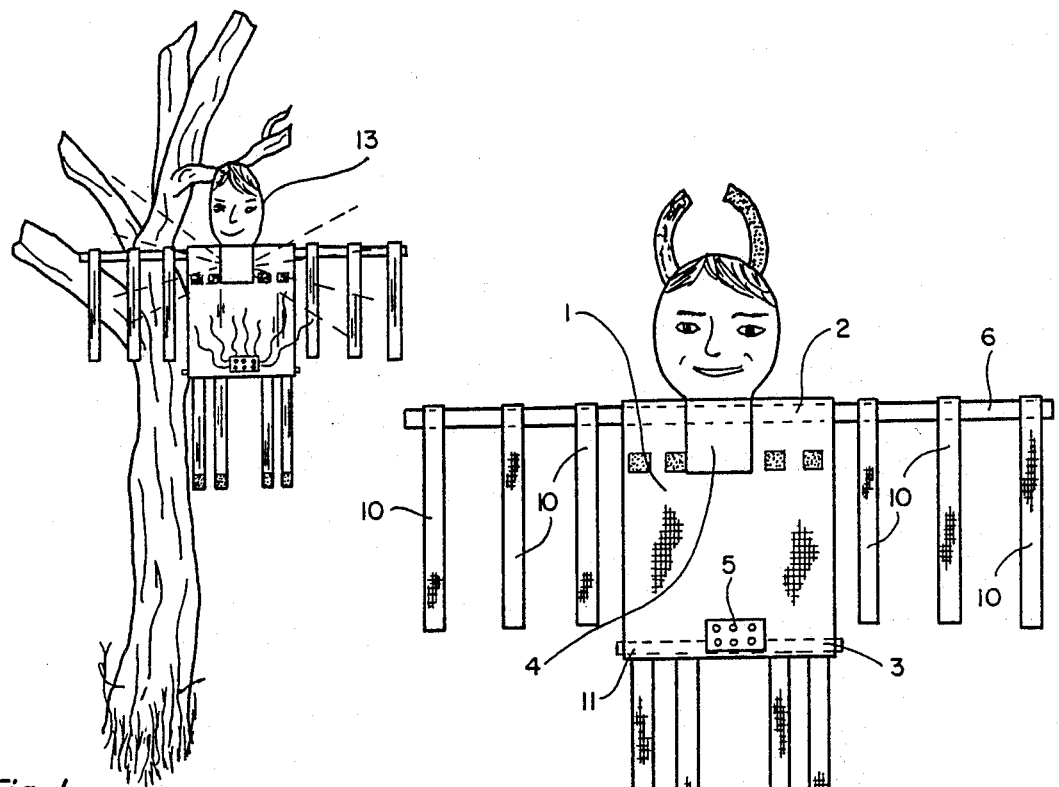
Fig. 1
Fig. 2
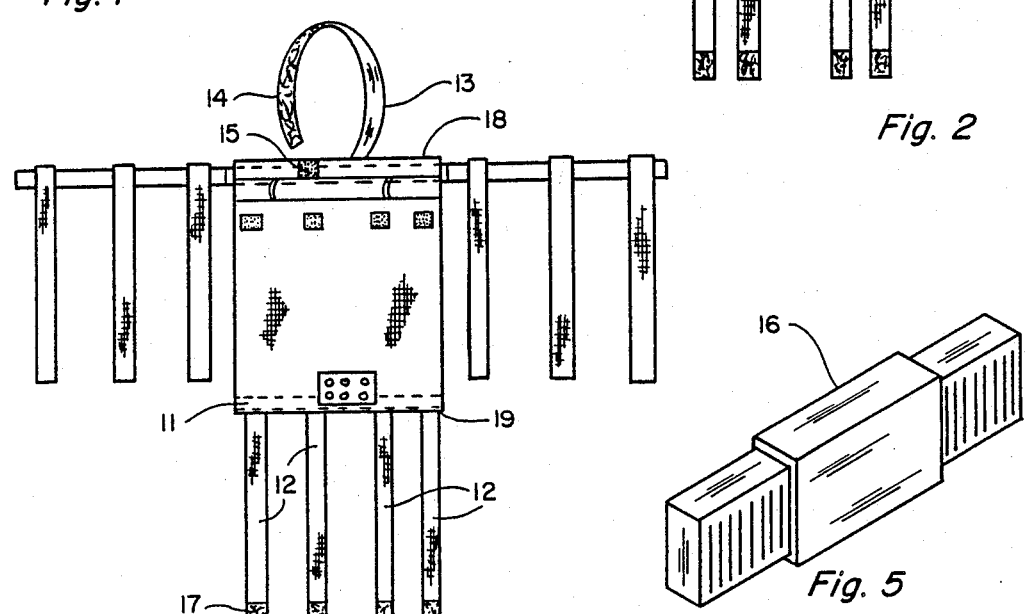
Fig. 3
Fig. 5
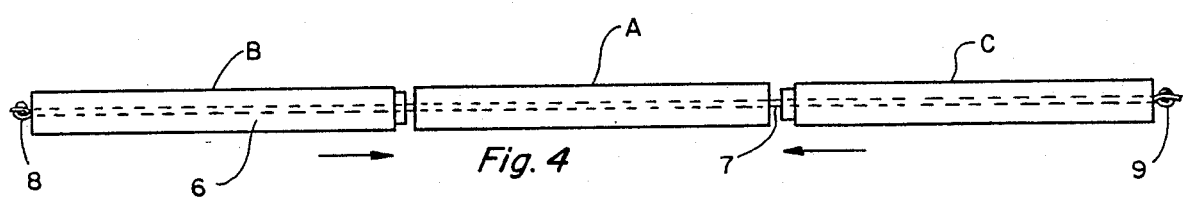
Fig. 4

DEER SCARECROW

BACKGROUND OF THE INVENTION

This invention relates to the field of hunting accessories. It is more particularly related to the field of deer hunting wherein a deer scarecrow is attached to a tree along the pathway frequented by deer. The hunger would wait at another area opposite the scarecrow so that the deer, when frightened by the scarecrow device, would flee in the direction of the hunger.

Scarecrows are not unknown in common useage. Scarecrows are frequently used in farmer's fields to frighten away crows or other birds or animals which do serious damage to crops. One such device is described in a U.S. Pat. No. 4,131,079. The '079 device consists of two spheres which are swingably attached to a pole. The purpose of the device is to scare pests, such as birds, from an area to be protected. Another approach to deterring pests or birds from fields is found in U.S. Pat. No. 4,109,605. The '605 patent involves the use of a series of pulleys and a motor to drive a number of scarecrow-like devices. Both of these devices relat to the protection of farmer's fields and not to the field of hunting.

The instant device relates to the field of hunting. Although it has features similar to a scarecrow device, its purpose is different. An object of this invention is to provide a device which will frighten a deer from a particular area. Another object of this invention is to provide a device with a scent means for further repelling a deer. Still another object of this invention is to provide a device with an intermittent and erratic noise-making means which would further instill fear in a deer.

Further and other objects of this invention will become apparent upon reading the following Specification.

BRIEF DESCRIPTION OF THE INVENTION

This deer scarecrow device comprises a flaccid main body which has a head attached at the top. The body also has at least two pouches sewn into it. One of these pouches is located near the top of the body and a second pouch may be located near the bottom of the main body. The top and bottom of the main body is folded over upon itself and sewn so as to create a looped section to hold two rods. At the top of the main body, inserted in the upper looped section, is a collapsable shoulder rod which folds out when in use. At the bottom of the main body is a second waist rod which is inserted in the lower loop and which helps hold the entire scarecrow in a displayed position. Sewn into the flaccid material comprising the scarecrow are upper arm streamers and lower leg streamers.

Into the lower pouch is placed a sound-making device. This sound-making device emits an unnatural sound which has a tendency to frighten a deer. A scent device is placed inside the upper pouch. This scent device is also designed to frighten a deer.

Finally, the device has a velcro strip pile attached to the top of the head. In positioning this device in a displayed position one merely unfolds the arms which releases the streamers and loops the velcro strap pile around a convenient limb or other essentially horizontal support. The velcro strap pile is then attached and fastened to the corresponding velcro hook section.

The deer scarecrow can be detected by all three senses of a deer: sight, sound and smell. the device is not used to attract deer, but to repel them. Strategically placing this invention in one or more areas where the hunter would not normally be able to cover could change the route of travel of the deer. While most hunters use an attractant at the hunter's location, the instant invention carries this thought a step further by using the repellant device at non-hunter locations.

BRIEF DESCRIPTION OF THE DRAWINGS

FIG. 1 shows the scarecrow device in its environment of use.

FIG. 2 is a front view of the scarecrow device with arms extended.

FIG. 3 is a rear view of the device with arms extended.

FIG. 4 shows the foldable rods which may be folded out to form arms on the device.

FIG. 5 shows one embodiment of the scent means.

DETAILED DESCRIPTION OF THE PREFERRED EMBODIMENT

The main body of this invention consists of an essentially rectangular piece of lightweight, weather-resistant material. A bright colored material is preferable since the color would easily distinguish the scarecrow from its environmental surroundings. The main body 1 is folded back against itself at its top 18 and bottom 19. This fold is then sewn to the main body thus creating a top 2 and a bottom 3 rod-receiving loop. The loops are then sewn so as to secure the material.

A plurality of pouches are also sewn to the flaccid material. An upper pouch 4 and a lower pouch 5 are centrally located to receive a scent-making means and a sound-making means, respectively.

A collapsable shoulder rod 6 is shown generally in FIG. 4. The collapsable shoulder rod comprises three sections of approximately equal length. A center female section A is inserted through the upper loop 2. Male arm sections B and C are adapted to be inserted into respective ends of the female section A. An elastic cord 7 is threaded through the three sections and knotted at each end 8 and 9. Attached around each arm B and C is fabric material similar to the main body and a plurality of arm streamers 10. These streamers are made of the same material as is the main flaccid body and arm sleeves and are capable of rolling up on each arm when not in use. The arm streamers may be attached to the arm sleeves in any convenient manner, such as by sewing. Arms B and C may be folded in upon themselves and upon the female member A when not in use. The elastic band 7 which runs through arms A, B and C provides the needed tension to keep the arms positioned in an extended manner when the scarecrow is in use.

A lower waist rod 11 is also slipped through the lower loop. This lower waist rod provides a weight which keeps the main body displayed in a fully extended position when the deer scarecrow is attached to a support device. Attached to the lower portion of the main body are lower leg streamers 12. A plurality of leg streamers are attached to provide an added feature for frightening the deer. The lower streamers may be attached to the main body by sewing or by any other convenient means. The lower leg streamers 12 are preferrably made of the same material as the upper arm streamers 10 and the main body 1.

Also attached to the upper part of the main body is a head 13. The head 13 is composed of a flaccid material capable of looping around a tree limb or other essentially horizontal supporting device. In attaching the scarescrow to a limb the front of the head 13 is faced in the direction that one expects a deer to travel. The rear portion of the head 14 comprising the velcro pile is looped around the limb and attached to the velcro fastening hook assembly 15. The deer scarecrow is then conveniently attached to a supporting device and may be adjusted by adjusting the slack in the front 13 and back 14 of the head. The front 13 of the head is attached to the main body by sewing it into the fabric material. The back half of the head 14 comprises the pile portion of the velcro fastener. The velcro fastener 14 may be attached at the appropriate amount of slackness to the hook portion of the velcro fastener 15 which is located on the main body near the upper shoulder rod 2.

A scent device 16 as shown in FIG. 5 is also located within the upper pouch 4. Preferrably the scent device 16 is made of plastic or other similar weather-resistant material. The scent device is completely sealed when it is in the closed configuration. When open, as shown in FIG. 5, the device emits a scent from a pad or sponge soaked in a desirable scent material. The scent material should be a scent which is entirely unnatural to a deer. The scent could be a human scent which could be obtained from wet hair, perspiration, or other similar human scents. In practice it has been found that a scent which smells like a human is most frightening to a deer and is most effective in this application. When traveling, this scent device is sealed and closed. (Sealing the scent device should be done so that the device does not spread a scent through the woods when the device is not in a position to be functioning.) The pads in the device are replacable or reuseable when the scent has lost its strength. Scent devices such as the one shown in FIG. 5 are common, although the particular human scent applied to the pads on the inside of the device is unique to this invention. Bathroom deodorizers or similar scent- emitting devices are common in the United States and are available in many common locations.

Also attached to the deer scarecrow is a small, lightweight and preferrably weatherproff sound-making device. This small device is located near the bottom of the main body in the lower pouch 5. The lower pouch pouch has a plurality of holes, as shown, to enable the sound to better escape the pouch. This sound device ideally will make sounds at a controlled interval at a volume that approximates the decibel level of a human voice. The sounds could be of actual voice recordings or merely a series of beeps, sirens, bells, whistles, or other noise-making devices. The gist of the sound-making device is that it emits a sound that is not natural in the woods. A noise that would be out of place for a deer to normally hear would be suitable. This sound-emitting device could be a small cassette player or a similar battery operated sound device. The sound-emitting device could also be powered by a mechanical spring which would then enable the device to emit the sound. Any device that would produce an unnatural sound in the woods on a timed interval basis would be appropriate.

This deer scarecrow device is lightweight, weather-resistant and highly portable. When not in use the scent device is placed within the pouch used to carry it. Likewise, the sound-making device may be conveniently stored in its pouch. In transporting the device, the arms B and C are folded back upon the female section A. With the arm streamers folled about each arm and the arms folded about the female section A, the essential shape of the main body, which is rectangular, is preserved. The lower leg streamers 12 have velcro pile pads 17 located at the ends thereof. The head may be folded over the top of the main body section and the entire device may be rolled into a small cylindrical form. The leg streamers 12 are then rolled around the cylinder and fastened by means of velcro hook fasteners. The entire device is then easily transportable and may be positioned in any convenient area.

When positioning the deer scarecrow one need only find a small limb for attachment purposes. The device is then unrolled and the arms extended. The head is looped around the limb and attached by means of the velcro fastener. The scent device is then opened and the sound device is switched on. Since the invention can be detected by all three sensed of a deer, it is very effective in spooking or frightening a deer so that it will leave the area where the deer scarecrow is positioned. This device does not attract deer but repels them. Strategically placing this invention in one or more areas where the hunter would not appear would change the route of travel of the deer. The hunter has nothing to lose in deploying this device because he will not see a deer in an area where he has not positioned himself. Use of this device should approximately double the hunter's odds of seeing a deer. Use of more than one of these devices would enhance the hunter's chances of seeing a deer accordingly.

Although this invention is designed for use by hunters it can also be used by farmers to repel deer from their fields. Additionally, one may use a solid rod support with a horizontal member for placing the deer scarecrow where no convenient tree limbs are available. This solid rod support would consist of an essentially vertical rod driven into the ground with a horizontal member for hanging the deer scarecrow.

It is obvious that the gist of this invention is to provide a highly portable and frightening device for deploying while hunting deer. The Specification previously described herein is a description of the preferred embodiment. Obviously, minor variations of this idea come within the ambit of the current invention.

Having completely described the method of use and construction of my new invention, I claim:

1. A deer scarecrow, comprising:
   (1) a flaccid main body having a head attached at the top thereof and at least two pouches thereon;
   (2) a collapsible shoulder rod attached to the top of said main body, forming two arms when in an extended position, each of said arms having a plurality of arm streamers attached thereto;
   (3) a waist rod attached to the bottom of said main body;
   (4) a plurality of leg streamers attached to the bottom of said main body and dangling underneath said main body;
   (5) a scent means located in at least one of said main body pouches;
   (6) a sound-making means located in at least one of said main body pouches;
   (7) a means for fastening said deer scarecrow to an upright support.

2. A deer scarecrow as in claim 1, wherein said main body and leg streamers are made of lightweight, weather resistant, brightly colored material.

3. A deer scarecrow as in claim 1, wherein said shoulder rod has three sections of approximately equal length which are unfolded and extended outwardly to form arms.

4. A deer scarecrow as in claim 1, wherein said shoulder and waist rods are attached to said main body by means of slipping said rods through top and bottom rod-receiving loops.

5. A deer scarecrow as in claim 1, wherein said scent means is a plastic, airtight, resealable container that may be opened to emit a deer-spooking scent.

6. A deer scarecrow as in claim 5, wherein said scent means may be opened when in use and re-sealed for storage.

7. A deer scarecrow as in claim 1, wherein said sound making means emits unnatural sounds at a timed interval.

8. A deer scarecrow as in claim 7, wherein said sound making means is battery operated.

9. A deer scarecrow as in claim 7, wherein said sound making means is mechanically powered by a spring mechanism.

10. A deer scarecrow as in claim 1, wherein said fastening means comprises a velcro pile strap attached to the top of said head which may be looped around a suitable support and fastened by means of a velcro hook fastener.

* * * * *